United States Patent [19]

Anderson

[11] Patent Number: 4,571,620
[45] Date of Patent: Feb. 18, 1986

[54] LUMINANCE PEAKING FILTER FOR USE IN DIGITAL VIDEO SIGNAL PROCESSING SYSTEMS

[75] Inventor: William D. Anderson, Indianapolis, Ind.

[73] Assignee: RCA Corporation, Princeton, N.J.

[21] Appl. No.: 549,489

[22] Filed: Nov. 4, 1983

[51] Int. Cl.[4] .................. H04N 5/14; H04N 5/21
[52] U.S. Cl. ...................... 358/166; 358/37; 333/166
[58] Field of Search .......... 358/166, 37, 162; 333/166

[56] References Cited

U.S. PATENT DOCUMENTS

| | | | |
|---|---|---|---|
| 3,984,631 | 10/1976 | Avicola | 178/7.3 R |
| 3,984,865 | 10/1976 | Avins | 358/36 |
| 4,041,531 | 8/1977 | Bingham | 358/37 |
| 4,074,308 | 2/1978 | Gibson | 358/38 |
| 4,179,705 | 12/1979 | Faroudja | 358/31 |
| 4,511,922 | 4/1985 | Lewis, Jr. | 358/166 |

Primary Examiner—Michael A. Masinick
Assistant Examiner—E. Anne Toth
Attorney, Agent, or Firm—E. M. Whitacre; P. J. Rasmussen; E. P. Herrmann

[57] ABSTRACT

A digital peaking circuit for processing digital luminance signal in a video processing system combines parallel paths of delay elements and summing circuits to produce the desired luminance response curve with minimum hardware. Only one scaling circuit is required to achieve the desired frequency response characteristic and one multiplier is included to render the peaking circuit adaptive.

10 Claims, 5 Drawing Figures

LUMINANCE PEAKING FILTER FOR USE IN DIGITAL VIDEO SIGNAL PROCESSING SYSTEMS

The present invention relates to apparatus for processing the luminance component of a video signal and more particularly for establishing a desired amplitude versus frequency response of the luminance component in, e.g., a digital television receiver. In order to improve the sharpness and fine detail resolution of the image, it is desirable to improve the transient response of the luminance channel by increasing the high frequency response of the luminance channel.

The response of video signal processing systems may be subjectively improved by increasing the steepness of amplitude transitions in the video signals, and the response may also be improved by the generation of a preshoot just before a transition and an overshoot just after the transition. It is also known that a desired amplitude or phase characteristic (or both) as a function of frequency may be formed substantially without introducing phase non-linearity or phase distortion by means of an apparatus wherein delayed signals generated at terminals (usually referred to as taps) along a delay line or like device are combined in a predetermined manner. Such apparatus, sometimes called a "transversal equalizer" or "transversal filter", is generally described in U.S. Pat. No. 2,263,376 (A.D. Blumlein et al.).

In a television or similar system for processing a composite signal to provide a predetermined signal transfer characteristic, such as accentuation of selected frequencies, it is desirable to include peaking circuitry in the luminance channel of a color television receiver which is readily adaptable to control (e.g., relatively) accentuate or peak) high frequency portions of the luminance signal component of the video signal. For example, it may be desirable to controllably accentuate the amplitude of certain relatively high frequency portions of the luminance signals depending on the quality of the received television signal.

FIG. 1 illustrates a transfer function which when applied to the luminance signal produces very desirable subjectively improved reproduced images. The present invention is directed toward apparatus for generally emulating this transfer function in the luminance channel of a digital video signal processing system. In the context of a digital TV receiver such apparatus must be realized with a minimum of parts in order to produce a cost effective receiver.

SUMMARY OF THE INVENTION

Apparatus in accordance with the present invention comprises a luminance peaking circuit realized by a finite impulse response (FIR) filter including the parallel connection of first and second input weighted FIR filters. The first FIR filter produces a low pass filter response with tap weights that are all (+1's). The second FIR filter is a bandpass input weighted filter having tap weights of $(1+A)$ and $(-A)$ which are realized using a single fixed scaling device. The output port of the second FIR filter is applied to a variable scaling device, the output port of which is connected to one input port of an adder circuit. The output port of the first FIR filter is coupled to a second input port of the adder circuit, the output port of which is the output port of the peaking circuit. The high frequency response of the peaking circuit is adjusted by varying the scale factor applied to the variable scaling device.

DETAILED DESCRIPTION

The luminance peaking circuit in a TV receiver is employed to subjectively enhance transitions of vertical lines in the displayed image. Signal representing relatively sharp transitions generally contains high frequency signal components. The transitions may be selectively enhanced by increasing the amplitude response of the high frequency components of the luminance signal. However, care must be taken to ensure that the peaking of the higher frequencies of the luminance signal does not introduce ringing of these high frequency components. Thus, the overall peaking response must be tailored to roll off gradually at the upper end of the spectrum while guaranteeing a high degree of attenuation of frequencies in the range of the sound signal components. In addition, it is most desirable that the peaking response have linear phase characteristics. It has been found in the past that the general frequency response curve illustrated in FIG. 1 produces the desired peaking characteristics when generated with linear phase components.

Figure 2:
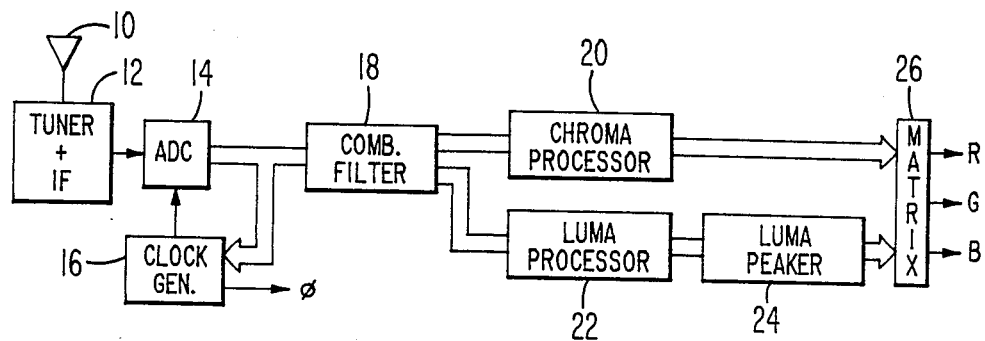
FIG. 2 is a block diagram of a digital TV receiver including a digital peaking circuit.

FIG. 2 is a block diagram of a digital TV receiver indicating the major signal processing circuits including a luminance peaking circuit. In the figure, broadcast TV signals are received by antenna 10 and applied to conventional tuner and intermediate frequency circuitry 12. Baseband analog composite video signal from element 12 is applied to the input or an analog-to-digital converter (ADC) 14 which samples the signal at a rate of, e.g., four times the color subcarrier frequency and generates digital representations of the analog signal. The ADC 14 is controlled by a sampling signal provided by a clock generator 16 which may be a phase locked loop circuit responsive to the digitized color burst reference component of the composite signal. Output samples from ADC 14 are applied to a comb filter 18 which selectively extracts the luminance and chrominance components of the composite video signal. The chrominance component is applied to the chrominance processing circuit 20, which may include a gain control function, filter circuitry and color mixture signal demodulating circuitry, wherein the chrominance signal is suitably conditioned for application to the color matrix circuit 26.

The luminance component from comb filter 18 is applied to the luminance processing circuit 22 which may include brightness control and vertical detail enhancement functions, etc. Conditioned luminance signal from processor 22 is applied to the luminance peaking circuit 24 which selectively enhances the amplitude response of the higher frequency components of the luminance signal. Peaked luminance signal from element 24 is applied to the color matrix 26 wherein it is appropriately combined with the processed chrominance signal to generate R, G and B color signals for driving the display tube. Note in the figure broad connecting lines are intended to indicate multiple signal paths for accommodating parallel bit streams, e.g., pulse code modulated binary samples.

It will be appreciated by those skilled in the art of designing digital processing circuitry, that significant numbers of devices are required to perform even relatively simple processing functions. For example, to sum two 8-bit signals requires in excess of 200 transistors. It becomes readily apparent that to realize the requisite processing functions of a TV system in digital hardware, with a manageable and cost effective number of devices, each functional component must be designed in the simplest configuration commensurate with the desired response characteristics. Mindful of this constraint, the following peaking circuits were developed which, in the preferred embodiment, require only one multiplier circuit.

Figure 3:
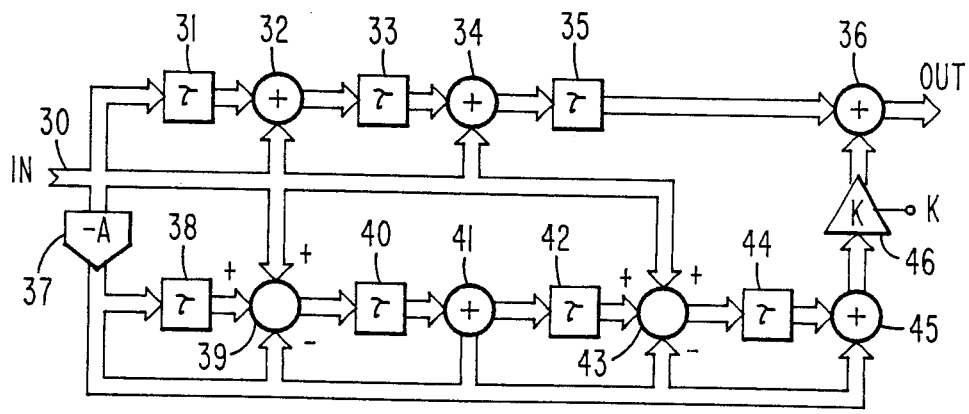
FIGS. 3 and 4 are logic schematic diagrams of two circuits for generally emulating the transfer response curve of FIG. 1.

FIG. 3 is a peaking circuit comprised of delay stages, adders, and two multipliers (37, 46). Multipliers 37 and 46 are of the type which scale applied signals by a constant factor. Multiplier 37 scales signals applied to its input port by a fixed factor $-A$, that is, the factor $-A$ is designed into the hardware. Note that if the factor $|A|$ is a multiple of two and the signal is in binary format, multiplier 37 may be a wiring arrangement to shift the significance of the sample bit positions rightward ($A<1$) or leftward ($A>1$).

Multiplier 46 is desirably of the type wherein its scale factor K is electrically variable so that the peaking function may be adapted to the condition of the applied luminance signal. Ideally, the scale factor K should be continuously variable to provide a wide range of adaptability. However, where coarse adjustments are acceptable, multiplier 46 may be controllable bit shifter, for example, a barrel shifter.

In FIG. 3 luminance samples are applied to input port 30 and peaked samples are available at the output port (OUT) of adder 36. The luminance samples are coupled to the input port of delay element 31 which is serially coupled to delay elements 33 and 35 via adder circuits 32 and 34, respectively. The luminance samples are also applied to second input ports of adders 32 and 34. The delay elements 31, 33 and 35 each delay samples applied thereto by one sample period. In "Z" transform notation, the transfer function of the serial connection can be shown to be $$\text{Sout/Sin} = Z^{-1} + Z^{-2} + Z^{-3} \tag{1}$$

where Sout represents the signal samples at the output port of delay element 35 and Sin represents the signal samples at the input port of delay element 31. For a sample rate of four times the color subcarrier of 3.58 MHz, the transfer function represents a low pass reponse having a cut off point of approximately 4.8 MHz. (The circuit consisting of elements 31—35 will be recognized as an input weighted FIR filter.)

The luminance samples from input port 30 are also applied to multiplier 37 which scales the samples applied thereto by the scale $-A$. Scaled samples from multiplier 37 are applied to the input port of delay element 38 which is cascaded with summing circuit 39, delay element 40, adder 41, delay element 44 and adder 45 in the recited order. Samples from multiplier 37 are also applied directly to summing circuits 39 and 43 and adders 41 and 45. Luminance samples from input port 30 are applied directly to summing circuits 39 and 43. Summing circuits 39 and 43 are respectively arranged to subtract the sample values from multiplier 37 from the sums of the luminance sample values plus the sample values provided by the respective delay element. Since the multiplier 37 scale factor is negative, the subtraction of the scaled samples by summing circuits 39 and 43 is in fact an addition and the addition by adders 41 and 45 is in fact a subtraction.

The application of samples from both input port 30 and scaling circuit 37 to summing circuit 39 (and 43) is effectively identical to applying a single sample stream equivalent to the input samples scaled by the factor $(1+A)$. The transfer function performed by the elements between input port 30 and the output port of adder 45 can be shown to be $$\text{Sout}_{45}/\text{Sin} = -A + (1+A)Z^{-1} - AZ^{-2} + (1+A)Z^{-3} - AZ^{-4} \tag{2}$$

which in general represents a band pass response. The combination of elements 37 to 45 will be recognized as a further input weighted FIR filter.

Signal samples from adder 45 are applied to multiplier 46 which scales the samples by the variable factor, K, applied to input terminal K. Scaled samples from multiplier 46 and samples from delay element 35 are applied to respective input ports of adder 36 which produces the peaked luminance samples. The composite transfer function between input terminal 30 and the output port of adder 36 is given by $$\text{Sout}_{36}/\text{Sin} = -AK + (1 + (1 + A)K)Z^{-1} + \\ (1 - AK)Z^{-2} + (1 + (1 + A)K)z^{-3} - AKZ^{-1}. \tag{3}$$

Figure 1:
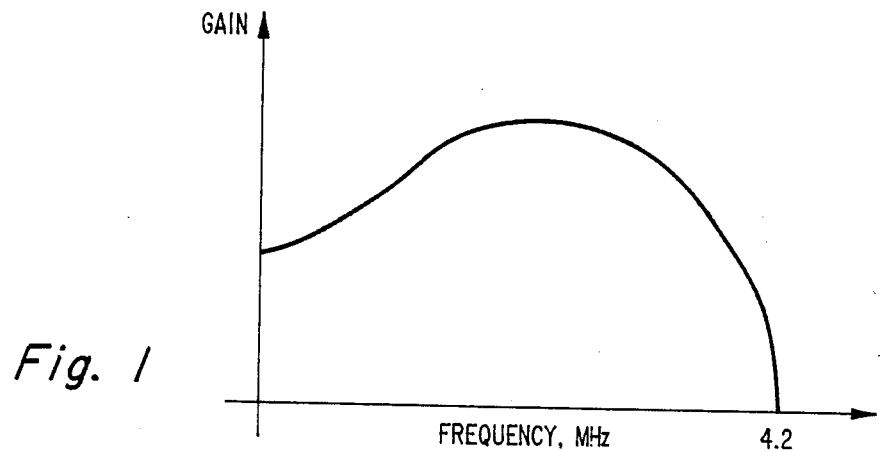
FIG. 1 is a peaked amplitude versus frequency response curve for the luminance component of a video signal in a TV receiver which subjectively enhances reproduced images.
Figure 5:
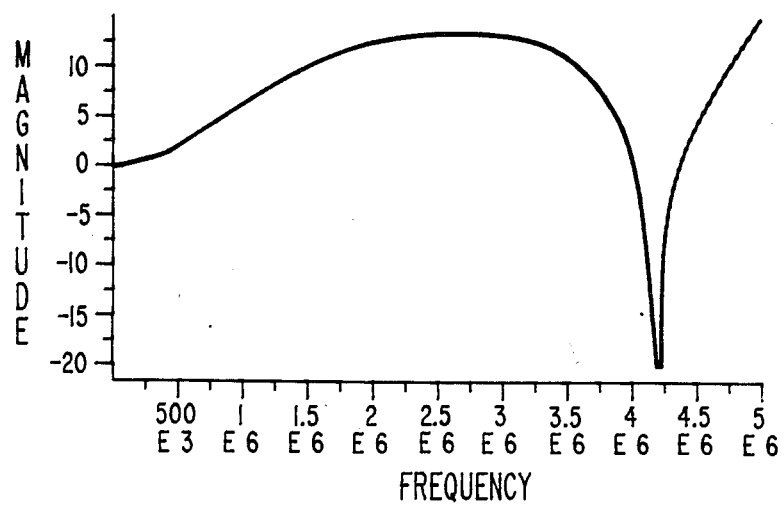
FIG. 5 is the relative amplitude versus frequency transfer function exhibited by the arrangement of FIG. 3 or 4 for the factor K of the variable scaling circuit equal to 4.

Substituting $A=2$ and $K=4$ in equation (3) results in the transfer function plotted in FIG. 5 which is seen to be closely similar to the desired luminance response curve of FIG. 1. Note that with $A=2$, multiplier 37 reduces to a one bit left shift and complementing circuit, and the transfer function of FIG. 5 has been generated by peaking circuitry requiring only one multiplier, i.e. element 46.

The value of the scale factor K applied to multiplier 46 controls the amplitude response of the higher frequency components of the applied signal. The larger the value of the scale factor K, the greater the amount of peaking applied to the signal. The value K may be applied by the viewer to satisfy his personal preference while viewing the displayed image. Alternatively, the value K may be made conditional on average signal amplitude, signal-to-noise ratio or other parameters and made automatically variable depending upon the controlling parameter.

If the luminance signal applied to terminal 30 is sufficiently band limited and attenuated at 4.2 MHz, the transfer function provided by the upper signal path of the FIG. 3 circuit is unnecessary. In this instance, delay elements 31, 33 and 35 may be cascaded by direct connection to the exclusion of adders 32 and 34. The upper signal path without adders 32 and 34 becomes an all-pass circuit at least for frequency components up to the Nyquist sampling limit.

Figure 4:
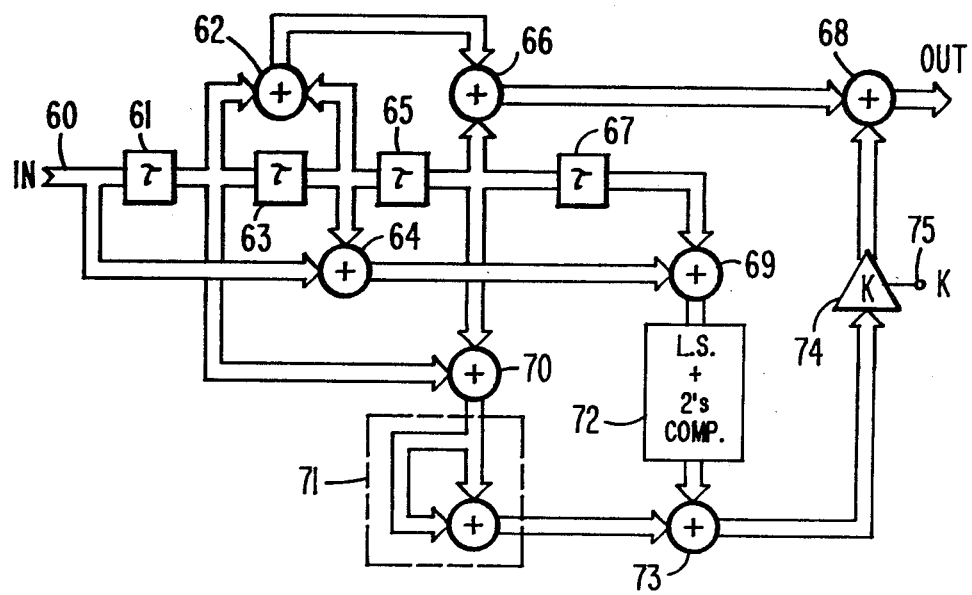

FIG. 4 is an alternative arrangement of the FIG. 3 peaking circuit which produces the transfer function of equation (3) for the scale factor A equal to 2 and the value K being variable. In FIG. 4, luminance samples are applied to input port 60 and peaked luminance signal is available at the output port of adder 68. The luminance samples are applied to the cascade connected delay stages 61, 63, 65 and 67 each of which delays the luminance samples by one sample period. Samples from delay stages 61, 63 and 65 are summed in adders 62 and 66 generating a transfer function between input port 60 and the output port of adder 66 given by $$Sout_{66}/Sin = Z^{-1} + Z^{-2} + Z^{-3} \quad (4)$$

which is equal to equation (1) generated by the low pass portion of the FIG. 3 circuit.

Samples from input port 60, delay stage 63 and delay stage 67 are summed by adders 64 and 69 and applied to element 72. Element 72 left shifts the samples from adder 69 one bit position (multiplies by two) and inverts the sample signal polarity (twos complements). Samples from delay stages 61 and 65 are summed in adder 70 and applied to a times 3 scaling circuit 71. Scaling circuit 71 is a hard wired left shift one bit position (multiply by two) and add circuit which produces the sum of one times+two times the applied signal. Samples from scaling circuit 71 and element 72 are summed in adder 73. The transfer function between input port 60 and the output port of adder 73 is given by $$Sout_{73}/Sin = -2 + 3Z^{-1} - 2Z^{-2} + 3Z^{-3} - 2Z^{-4}$$

which is equivalent to equation (2) for A=2.

Samples from adder 73 are applied to multiplier 74 wherein they are scaled by the variable factor K (applied at terminal 75). Signal samples from the output port of multiplier 74 and signal samples from the output port of adder 66 are applied to respective input ports of adder 68. The summed samples available from adder 68 represent the peaked luminance signal.

For the case of band limited luminance signals obviating the low pass transfer function adders 62 and 66 may be eliminated. In this instance, DC signal components will be contributed to the peaked signal via a direct connection between the output port of delay stage 63 and the input port of adder 68. The FIG. 4 circuit tends to be less complicated than the FIG. 3 circuit when the scale factor "A" is constrained to multiples of two. For scale factors "A" which are not multiples of two, the FIG. 3 peaking circuit tends to be less complicated.

What is claimed is:

1. A digital peaking circuit for peaking a luminance component of a digital video signal comprising:
   a source of digital luminance signals;
   a first digital processing circuit having an input port coupled to said source, having an output port and characterized by having the transfer function $f1 = Z^{-1} + Z^{-2} + Z^{-3}$ where the Z's indicate conventional Z transform notation;
   a second digital processing circuit having an input port coupled to said source, having an output port, and characterized by having the transfer function $f2 = -A + (1+A)Z^{-1} - AZ^{-2} + (1+A)Z^{-3} - AZ^{-4}$ where A is a constant scale factor;
   means connected to the output port of said second digital processing means for multiplying output samples produced thereby by a scale factor K; and
   summing means coupled to the means for multiplying and the output port of said first digital processing means for combining signal samples produced by said respective means to produce a peaked luminance signal.

2. The peaking circuit set forth in claim 1 wherein said first digital processing means includes:
   first, second and third delay elements having respective input and output ports;
   second and third summing means having respective first and second input ports and output ports;
   means for alternately connecting in cascade the first delay stage, the second summing means, the second delay stage, the third summing means and the third delay stage in the recited order with the output ports of the second and third summing means being respectively connected to the input ports of the second and third delay stages and the output ports of the first and second delay stages being connected to the respective first input ports of the second and third summing means;
   respective means for coupling said source to the input port of said first delay stage and the respective second input ports of the second and third summing means.

3. The peaking circuit set forth in claim 1 wherein said second digital processing means includes:
   first, second, third and fourth delay elements each having respective input and output ports;
   second, third, fourth and fifth summing means, said second and fourth summing means having respective first, second and third input ports and respective output ports, and said third and fifth summing means having respective first and second input ports and respective output ports;
   signal scaling means having an input port coupled to said source and having an output port;
   respective means for coupling the output port of said scaling means to the respective first input ports of said second, third, fourth and fifth summing means, and to the input port of said first delay element;
   respective means for coupling the output ports of said first, second, third and fourth delay elements to the respective second input ports of the second, third, fourth and fifth summing means, respctively; and
   respective means for coupling said source to the respective third input ports of said second and fourth summing means and wherein the output port of said fifth summing means corresponds to the output port of said second digital processing means.

4. The peaking circuit set forth in claim 3 wherein said scaling means scales signal samples applied thereto by a factor of −2.

5. The peaking circuit set forth in claim 3 wherein said scaling means includes a bit shifter.

6. The peaking circuit set forth in claim 1 wherein said first digital processing means includes:
   first, second and third delay elements having respective input and output ports, said delay elements being cascade connected in the recited order and the input port of said first delay element being coupled to said source;
   second summing means coupled to the output ports of said first, second and third delay elements for combining samples from said first, second and third delay elements, and having an output port corresponding to the output port of said first digital processing circuit.

7. The peaking circuit set forth in claim 6 wherein said second digital processing means includes:

a fourth delay element having an input port coupled to the output port of said thid delay element and having an output port;

third summing means coupled to said input port, the output port of said second delay element and the output port of said fourth delay element;

fourth summing means coupled to the respective output ports of said first and third delay elements;

first and second scaling means respectively coupled to output ports of said third and fourth summing means for scaling signal samples applied thereto; and fifth summing means for combining the scaled samples from said first and second scaling means, and having an output port corresponding to the output port of said second digital processing means.

8. A digital luminance signal peaking circuit comprising:

a source of digital luminance signals;

first, second, third and fourth similar delay elements having respective input and output ports;

a scaling circuit having an input port coupled to said source and having an output port coupled to the input port of said first delay element;

first summing means having first, second and third input ports respectively coupled to said source and the output ports of said scaling means and said first delay element and having an output port coupled to the input port of said second delay element;

second summing means having first and second input ports coupled respectively to the output ports of said scaling means and said second delay element and an output port coupled to the input port of said third delay element;

third summing means having first, second and third input ports coupled respectively to said source and the output ports of said scaling means and said third delay element and having an output port coupled to the input port of said fourth delay element;

fourth summing means having first and second input ports respectively coupled to the output ports of said scaling means and the output port of said fourth delay element, and having an output port;

sample multiplying means having an input port coupled to the output port of said fourth summing means, and having an output port;

fifth, sixth and seventh delay elements similar to said first through fourth delay elements having respective input and output ports;

fifth summing means having a first input port coupled to the output port of said multiplying means, having a second input port and an output port corresponding to an output port of said peaking circuit; and means for coupling said fifth, sixth and seventh delay elements in cascade between said source and the second input port of said fifth summing means.

9. The peaking circuit set forth in claim 8 wherein the means for coupling the fifth, sixth and seventh delay elements includes:

sixth and seventh summing means having respective first input ports coupled to said source, having respective second input ports coupled to the output ports of the fifth and sixth delay elements, respectively, and having respective output ports coupled to the input ports of the sixth and seventh delay elements, respectively.

10. Apparatus for peaking a digital luminance signal comprising:

a source of digital luminance signal;

a first input weighted FIR filter including the cascade connection of alternating delay elements and summing circuits wherein the first element of said cascade connection is a delay element having an input port coupled to said source and each summing circuit has an input port connected at said source;

a second input weighted FIR filter including the cascade connection of alternating delay elements and summing circuits wherein the first element of said cascade connection is a delay element and the lastmost element is a summing circuit, the odd numbered summing circuits in said cascade connection having respective input ports coupled to receive scaled luminance signal from said source scaled by a first value, the even numbered summing circuits and said first delay element having respective input ports coupled to received scaled luminance signal from said source scaled by a second value;

multiplying means having an input port coupled to said lastmost summing circuit of said second FIR filter for multiplying the filtered samples by a selectable coefficient; and means for combining signal provided by said first FIR filter and signal provided by said multiplying means to produce a peaked luminance signal.

* * * * *